United States Patent [19]

Lee

[11] 4,376,195

[45] Mar. 8, 1983

[54] METHOD OF PREPARING HIGH PURITY POLYAMIC ACIDS FOR USE IN ELECTRONIC CIRCUITRY

[75] Inventor: Ying K. Lee, Cherry Hill, N.J.

[73] Assignee: E. I. Du Pont de Nemours and Company, Wilmington, Del.

[21] Appl. No.: 337,668

[22] Filed: Jan. 7, 1982

[51] Int. Cl.$^3$ ............................................. C08G 73/10
[52] U.S. Cl. ..................................... 528/353; 528/188
[58] Field of Search ................................ 528/353, 188

[56] References Cited

U.S. PATENT DOCUMENTS 4,225,702  9/1980  Makino et al. ...................... 528/353
4,269,968  5/1981  Duran et al. ........................ 528/353

*Primary Examiner*—Lester L. Lee
*Attorney, Agent, or Firm*—William H. Thrower

[57]  ABSTRACT

A method of increasing the yield of a high purity polyamic acid that is the reaction product of a diamino compound and a polycarboxylic acid dianhydride, comprises:
1. purifying an inert solvent by distillation or ion-exchange;
2. purifying the dianhydride by sublimation;
3. purifying the diamino compound by a slurry process that involves the repeated washing of the diamino compound first with deionized water and then methanol; and
4. reacting the purified diamino compound with the purified dianhydride in the purified inert solvent.

1 Claim, No Drawings

METHOD OF PREPARING HIGH PURITY POLYAMIC ACIDS FOR USE IN ELECTRONIC CIRCUITRY

BACKGROUND OF THE INVENTION

This invention relates to an improved method of preparing high purity polyamic acids, to be transformed into polyimide resins which, in turn, are used in the processing of circuitry in the microelectronics industry. The improvement relates to increased yield.

Due in part to such characteristics as high tensile properties, desirable electric properties and excellent stability in the face of heat and water, polyimide resins have been widely used in the processing of microelectronic circuitry. However, the electrical properties of microelectronic circuits can be impaired by the presence of ionic impurities, hence it is vital that polyamic acids and polyimides prepared from them, be ionically "pure". The necessity of using polyamic acids with reduced ionic impurities, when working in the electronics field, is well-recognized. For example, see U.S. Pat. No. 4,225,702, issued Sept. 30, 1980, to Mikino et al.

Mikino et al. disclose a method of preparing a polyamic acid with reduced ionic impurities. It involves reacting a diamine or diaminoamide compound monomer with a polycarboxylic acid dianhydride monomer, wherein said monomer compounds have been purified by a recrystallization process so that they have reduced ionic impurities.

While recrystallization is an acceptable method of reducing impurities, it has the disadvantage of yielding purified monomers in an amount equivalent to only about 80 to 85% by weight of the unpurified monomer.

The present invention provides an improved method of preparing high purity polyamic acids that provides an increased yield of the purified monomers.

SUMMARY OF THE INVENTION

A method of increasing the yield of a high purity polyamic acid that is the reaction product of a diamino compound and a polycarboxylic acid dianhydride, comprises:

1. purifying an inert solvent by distillation or ion-exchange;
2. purifying the dianhydride by sublimation;
3. purifying the diamino compound by a slurry process that involves the repeated washing of the diamino compound first with deionized water and then methanol; and
4. reacting the purified diamino compound with the purified dianhydride in the purified inert solvent.

DETAILED DESCRIPTION OF THE INVENTION

The polyamic acids resulting from the present invention will have structures that vary with the specific kind of diamino compound and polycarboxylic acid dianhydride reacted together. Many kinds of polyamic acids are of course well-known in the art. For example, see U.S. Pat. No. 3,179,614 issued Apr. 20, 1965 to Edwards, and also U.S. Pat. No. 3,179,634 issued Apr. 20, 1965 to Edwards. Both of these patents are hereby incorporated into the present disclosure by reference.

A typical polyamic acid which may be prepared by the method of the present invention has the formula:

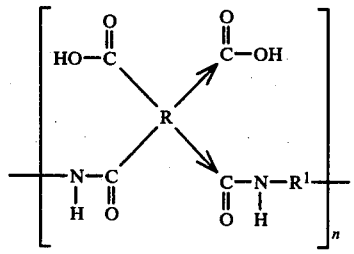

wherein → denotes isomerism; wherein R is an organic tetravalent radical containing at least 2 carbon atoms, no more than 2 carbonyl groups of each polyamic acid unit being attached to any one carbon atom of said tetravalent radical; wherein $R^1$ is a divalent radical containing at least 2 carbon atoms, the amide groups of adjacent polyamic acid units each attached to separate carbon atoms of said divalent radical; and wherein n is an integer sufficient to provide said polyamic acid with an inherent viscosity of at least 0.1.

The monomeric compounds used to prepare a polyamic acid of the kind just described are organic diamines and tetracarboxylic acid dianhydrides. The organic diamines are characterized by the formula $H_2N-R^1-NH_2$ wherein $R^1$ may be selected from the following groups: aromatic, aliphatic, cycloaliphatic, combination of aliphatic and aromatic, heterocyclic, bridged organic radicals wherein the bridge is oxygen, nitrogen, sulfur, silicon or phosphorus, and substituted groups thereof.

The tetracarboxylic acid dianhydrides are characterized by the following formula:

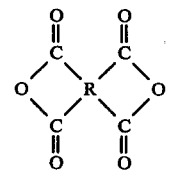

wherein R is a tetravalent organic radical selected from the group consisting of aromatic, aliphatic, cycloaliphatic, heterocyclic, combination of aromatic and aliphatic, and substituted groups thereof.

The inert solvents used in preparing the polyamic acids resulting from the method of the present invention are those organic solvents whose functional groups do not react with either of the reactants (the diamines or the dianhydrides) to a greater extent than the reactants do with each other. Besides being inert to the system and, preferably, being a solvent for the polyamic acid product, the organic solvent must be a solvent for at least one of the reactants, preferably for both of the reactants. Typical solvents are, for example, N-methyl-2-pyrrolidone, N,N-dimethylacetamide, and N,N-dimethylformamide.

The preparation of a high purity polyamic acid by the method of the present invention is performed as follows.

The inert solvent in which the diamino compound and dianhydride are reacted is purified, for instance, by distillation or ion-exchange. Usually, distillation may be advantageously performed rather than ion-exchange because it may decrease the water content as well as remove ionic impurities.

The purification of the dianhydride is performed by sublimation which is conducted under per se known, non-limiting conditions. Namely, the dianhydride is heated under vacuum so that it goes directly from the solid to vapor phase. The pure vapor is then collected in an air cooled condenser, yielding a purified product equivalent to about 95% by weight of the unpurified starting material.

The diamino compound, typically a diamine, is purified by a slurry process that also provides improved yield of the purified product in comparison to the yield typically provided by recrystallization. The slurry purification process involves repeated washing of the diamine first with deionized water and finally with methanol, filtering off the water or methanol after each wash. The diamine is then dried to provide an overall yield of the purified product equivalent to about 90% by weight of the unpurified starting material.

The invention is further understood by the following example. All percentages and parts are by volume unless otherwise noted.

EXAMPLE

1. Solvent Purification

N-methyl 2-pyrrolidone is distilled under vacuum (48–68 mm Hg absolute) at 112°–122° C. in a 304 or 316 stainless steel reactor. The first 10% of distillate is discarded and the next 70% is collected and redistilled. The first 5% of the redistilled solvent is discarded and the next 80% is collected as the final purified solvent. The double distilled N-methyl-2-pyrrolidone is filtered through 1 micron polypropylene filters and stored in polyethylene lined containers with a nitrogen blanket. Under these conditions, N-methyl-2-pyrrolidone is obtained with a maximum sodium content of 0.7 ppm. The level of chloride ion is not detectable. Aromatic hydrocarbon solvent is purified in the same way.

2. Dianhydride Purification

Pyromellitic dianhydride powder is placed in a modified McCarter type sublimater. It is heated to 175°–200° C. under vacuum ($1 \times 10^{-2}$ mm Hg absolute), and the resulting vapor passes through a filter media composed of Armalon ® felt ped (3 mm thick) in between two stainless peds. The vapor is collected in an air cooled conical glass condenser to yield the purified pyromellitic dianhydride.

3. Diamino Compound Purification

A 4—4'-diamino diphenyl ether filter cake is slurried for 1 hour at room temperature in a stainless steel vessel using 1 part of the diamine to 3 parts deionized water (100,000 ohm minimum) with 10% methanol. The water/methanol is filtered off and slurry of the filter cake is repeated in the same manner. The water/methanol is again removed by filtration and the filter cake is then slurried in fresh methanol for ½ hour (1 part diamine/3 parts methanol). The methanol is filtered off and the filter cake is then rinsed with methanol. The diamine is dried in a vacuum oven at 60° C. for 10 hours. 4-4'-diamino diphenyl ether obtained through this procedure has a sodium content of 2.5 max, the chloride ion being 7.0 ppm max.

The yield is >90% by weight, based on the weight of the unpurified 4-4'-diamino diphenyl ether. Dry diamine is packaged in polyethylene bags inside an airtight polyethylene lined container.

4. Polyamic Acid Preparation

A 100 ml stainless steel container equipped with a stirrer and thermometer is charged with 602.83 grams of N-methyl 2-pyrrolidone, 143.55 grams of aromatic hydrocarbon and 63.67 grams (0.2 mole) of 4-4'-diamino diphenyl ether and stirred thoroughly. To this mixture 67.95 grams (0.3 mole) of pyromellitic dianhydride are added at a rate of 2.5 grams per minute. Once the addition is completed, the entire mixture is stirred for 2 hours to complete the reaction. Temperature is maintained between 25°–35° C. during the whole process. The product obtained by this procedure contains 14% by weight of solids, based on the weight of the solution.

The resulting polyamic acid of this Example has reduced ionic impurities and is suitable for use in the processing of circuitry in the microelectronics industry.

What is claimed is:

1. A method of increasing the yield of a high purity polyamic acid that is the reaction product of a diamino compound and a polycarboxylic acid dianhydride, comprising:
   a. purifying an inert solvent by distillation or ion-exchange;
   b. purifying the dianhydride by sublimation;
   c. purifying the diamino compound by a slurry process that involves the repeated washing of the diamino compound first with deionized water and then methanol; and
   d. reacting the purified diamino compound with the purified dianhydride in the purified inert solvent.

* * * * *